United States Patent [19]
Kitamura

[11] Patent Number: 5,631,410
[45] Date of Patent: May 20, 1997

[54] VIBRATING PROBE ATOMIC FORCE MICROSCOPE

[75] Inventor: Shinichi Kitamura, Saitama, Japan

[73] Assignee: JEOL Ltd., Tokyo, Japan

[21] Appl. No.: 570,758

[22] Filed: Dec. 12, 1995

[30] Foreign Application Priority Data

Dec. 12, 1994 [JP] Japan ................... 6-307737

[51] Int. Cl.$^6$ ........................................ G01B 5/28
[52] U.S. Cl. ........................................ 73/105
[58] Field of Search ................ 73/105; 250/306

[56] References Cited

U.S. PATENT DOCUMENTS

| | | | |
|---|---|---|---|
| 5,144,833 | 9/1992 | Amer et al. | 73/105 |
| 5,283,442 | 2/1994 | Martin et al. | 250/307 X |
| 5,345,816 | 9/1994 | Clabes et al. | 73/105 |
| 5,349,735 | 9/1994 | Kawase et al. | 250/306 X |
| 5,519,212 | 5/1996 | Elings et al. | 73/105 X |

OTHER PUBLICATIONS

AFM Imaging Modes, TopoMetrix Corporation, 1993, pp. 1–16.

Martin et al., "Atomic Force Microscope–Force Mapping and Profiling on a Sub 100–Å Scale", J. Appl. Phys., vol. 61, No. 10, 15 May 1987, pp. 4723–4729.

*Primary Examiner*—Hezron E. Williams
*Assistant Examiner*—Daniel S. Larkin
*Attorney, Agent, or Firm*—Webb Ziesenheim Bruening Logsdon Orkin & Hanson, P.C.

[57] ABSTRACT

An atomic force microscope capable of vibrating a cantilever at a constant amplitude at all times. Variations in the vibration of the cantilever are sensed by detecting the variation in the position of reflected light by a photodetector. The output signal from the photodetector is fed to a band-pass filter to extract those frequency components which are close to the resonance frequency of the cantilever. The output from the filter is fed to a waveform converter to convert the signal into a square-wave signal of a constant amplitude via a phase-adjusting circuit. The output from this waveform converter is supplied as a driving signal to a piezoelectric device via an amplitude-adjusting circuit and also to a frequency-to-voltage converter to convert the signal into a voltage signal $V_{fv}$ corresponding to the frequency. A reference voltage comparator produces the difference between the voltage signal $V_{fv}$ and a reference signal. This difference signal is supplied as a feedback signal to a z-scanner drive circuit.

5 Claims, 2 Drawing Sheets

VIBRATING PROBE ATOMIC FORCE MICROSCOPE

FIELD OF THE INVENTION

The present invention relates to a scanning probe microscope such as an atomic force microscope (AFM) and, more particularly, to a scanning probe microscope for obtaining information about a sample from variations in the vibration frequency of a cantilever.

BACKGROUND OF THE INVENTION

FIG. 1 shows the structure of the prior art atomic force microscope (AFM). In this figure, a sample 1 is placed on a z-scanner 2 which displaces the sample vertically or in the z-direction. The z-scanner 2 is placed on an xy-scanner 3 which moves the sample within the xy-plane perpendicular to the z-direction. The z-scanner 2 and xy-scanner 3 are driven in the z-, x- and y-directions by piezoelectric devices, for example. A scanning signal produced by an xy-scanning signal generator 4 is supplied to the xy-scanner 3.

A cantilever 5 consisting of a resilient body having one fixed end is located above the sample 1. A piezoelectric device 7 for applying vibration is mounted close to the fixed end of the cantilever 5. A probe 6 whose tip faces the sample 1 is mounted to the front end of the cantilever 5. The top surface of the cantilever 5 is a reflecting surface to which laser light L emitted from a laser 8 is directed. Light L' reflected from the cantilever 5 reaches a photodetector 9 where the light is detected. The photodetector 9 consists, for example, of bi-cell photodiodes and detects variations in the position of the reflected light L' caused by vibrations of the cantilever 5.

The output signal from the photodetector 9 is fed to an analog amplifier 10 incorporating an automatic gain control (AGC) circuit 11. The output signal from the amplifier 10 is supplied to a band-pass filter 12 which passes only frequencies close to the resonance frequency of the cantilever 5. The output signal from the filter 12 is furnished to a phase-adjusting circuit 13 and then to the piezoelectric device 7.

The AC signal from the photodetector 9 which is modulated with the resonance frequency of the cantilever 5 is converted into a voltage signal by a frequency-to-voltage (F/V) converter circuit 14. A reference voltage comparator 15 produces the difference between the voltage signal $V_{fv}$ from the frequency-to-voltage converter circuit 14 and a reference voltage signal $V_{fvo}$. The difference signal is sent to the z-scanner drive circuit 17 via the low-pass filter 16. The image-creating circuit 18 creates an image according to the difference signal extracted via the filter 16.

In the above-described structure, the cantilever 5 is deflected periodically by the piezoelectric device 7 and thus vibrated. In this way, the front end of the cantilever 5 is moved up and down. This results in variations in the position of the reflected light L' incident on the photodetector 9. The output signal from the photodetector 9 varies according to the varying position. FIG. 2(a) shows the waveform of the output signal from the photodetector 9. In the diagram of FIG. 2(a), time (t) is plotted on the horizontal axis while the z-position of the probe 6 is plotted on the vertical axis.

Those frequencies of the output signal from the photodetector 9 which are close to the resonance frequency of the cantilever 5 are extracted by the band-pass filter 12. The phase is adjusted by the phase-adjusting circuit 13 to produce positive feedback. The output signal from the phase-adjusting circuit 13 is supplied as a driving signal to the piezoelectric device 7. In this way, a self-oscillating loop for positive feedback is formed. As a result, the cantilever 5 keeps vibrating at its resonance frequency.

The AGC circuit 11 controls the gain of the amplifier 10 so that the amplitude of the output signal from the photodetector 9 is maintained constant. Since the controlled output signal from the amplifier 10 is supplied to the piezoelectric device 7, the amplitude of the vibration of the cantilever 5 is held constant. For example, if the amplitude of the vibration of the cantilever 5 increases or decreases for some cause to thereby vary the amplitude of the output signal from the photodetector 9, then the AGC circuit detects the increase or decrease in the amplitude of the output signal from the photodetector 9 and increases or reduces the gain of the amplifier 10 in such a way that the variation in the amplitude is canceled out. This varies the driving voltage of the piezoelectric device 7, thus canceling out the variation in the amplitude of the vibration of the cantilever 5.

When the cantilever 5 keeps vibrating at a constant amplitude in this way, if the sample 1 is brought close to the probe 6 until an atomic force is exerted between them, and if the xy-scanner 4 makes a two-dimensional scan in the x- and y-directions, then the resonance frequency of the cantilever 5 is apparently decreased under the influence of the gradient of the atomic force acting on the cantilever 5 according to the distance to the sample 1. The cantilever 5 vibrates at the decreased frequency. This frequency drops as the distance between the sample 1 and the probe 6 decreases. Conversely, if the distance increases, the frequency is increased. If the distance is so great that the atomic force is negligibly small, then the frequency becomes coincident with the resonance frequency of the cantilever 5.

The output signal from the photodetector 9 representing the vibration is converted into the voltage $V_{fv}$, corresponding to the frequency of the vibration by the frequency-to-voltage converter circuit 14. The comparator 15 produces the difference between this voltage $V_{fv}$, and the reference voltage $V_{fvo}$, to the z-scanner drive circuit 17 via the filter 16. It follows that a feedback control loop for controlling the distance between the probe 6 and the sample 1 according to the frequency is formed. The distance between the probe 6 and the sample 1 is maintained at a given value determined by the reference voltage $V_{fvo}$.

For instance, if the surface of the sample 1 is uneven, and if the distance between the probe and the sample decreases in the direction to lower the vibration frequency of the cantilever 5 as a result of a two-dimensional scan made by the xy-scanner, then the output voltage $V_{fv}$, from the converter circuit 14 drops, thus increasing the difference signal. The z-scanner 2 immediately lowers the sample 1. This, in turn, provides such feedback that the distance to the probe 6 is increased. Consequently, the distance between the probe 6 and the sample 1 is kept at the given value determined by the reference voltage $V_{fvo}$. Since this control operation is constantly performed, the feedback signal (difference signal) supplied to the z-scanner drive circuit 17 corresponds to the unevenness or topography of the sample surface. This feedback signal is accepted as an image signal into the image-creating circuit 18 in association with the two-dimensional scan made by the xy-scanner. An image is displayed according to the accepted image signal. In this way, the topography of the sample surface can be imaged according to the atomic force.

If the amplitude of the vibration of the cantilever 5 changes for some cause or other, then the amplitude of the output from the photodetector 9 varies. The AGC circuit 11 varies the gain of the amplifier 10 in such a way that the amplitude of the output from the amplifier 10 is maintained constant. In order to perform this control operation stably, a sufficiently large time constant is necessary. Furthermore, as the gain varies, the phase of the output from the amplifier 10 changes. In this manner, some factors impede stable self-oscillation showing good response. If the oscillation is stable (i.e., the amplitude is regulated), the response follows variation of the frequency caused by the unevenness of the sample surface with delay. Hence, an optimum feedback signal tends not to be produced. This directly deteriorates the quality of the obtained microscope image and the resolution.

The output signal from the photodetector 9 is directly sent to the frequency-to-voltage converter circuit 14. Since this signal is feeble, good frequency-to-voltage conversion cannot be done. As a result, the optimum feedback signal is not obtained. In consequence, the z-scanner 2 is not appropriately driven and the sample may not be imaged well.

SUMMARY OF THE INVENTION

It is an object of the present invention to provide an atomic force microscope having a cantilever which can be vibrated at a constant amplitude at all times.

A scanning probe microscope according to the present invention comprises a cantilever having one fixed end, a probe mounted to the other end of the cantilever, a displacement detector for detecting displacement of the cantilever, a waveform converter for converting the output from the displacement detector into a periodic pulse train waveform having the same period and a constant amplitude, an amplitude-adjusting circuit for varying the amplitude of the output from the waveform converter, and a means for vibrating the cantilever according to the output from the amplitude-adjusting circuit.

Another scanning probe microscope according to the present invention comprises a cantilever having one fixed end, a probe securely mounted to the other end of the cantilever, a displacement detector for detecting displacement of the cantilever, a waveform converter for converting the output from the displacement detector into a periodic pulse train waveform having a constant amplitude, an amplitude-adjusting circuit for varying the amplitude of the output from the waveform converter, a means for vibrating the cantilever according to the output from the amplitude-adjusting circuit, a means for creating from the output from the waveform converter a feedback signal for varying the distance between a sample and the probe so that the frequency of the cantilever assumes a selected value, and a means for varying the distance between the sample and the probe.

Other objects and features of the invention will appear in the course of the description thereof, which follows.

DETAILED DESCRIPTION OF THE INVENTION

Figure 1:
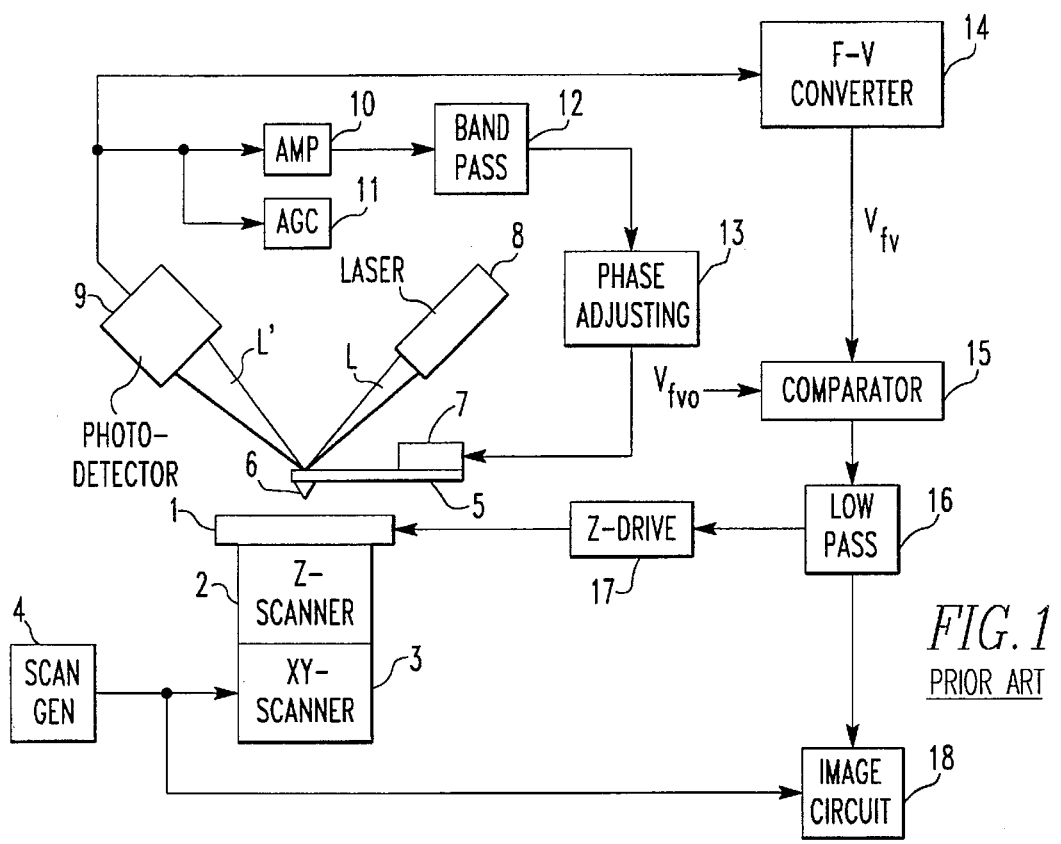
FIG. 1 is a block diagram of the prior art atomic force microscope.
Figure 3:
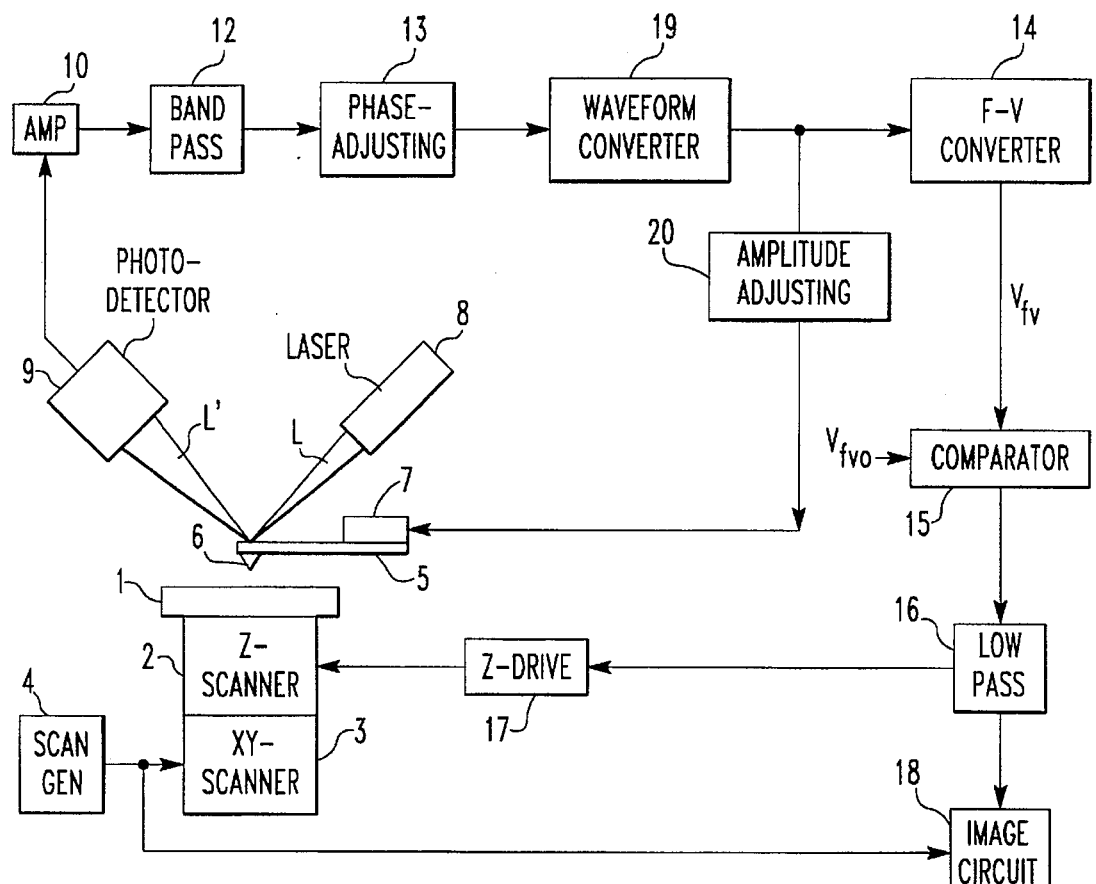
FIG. 3 is a block diagram of an atomic force microscope according to the present invention.

FIG. 3 illustrates an atomic force microscope embodying the concept of the present invention. It is to be noted that like components are indicated by like reference numerals in various figures. The instrument shown in FIG. 3 is similar to the prior art instrument shown in FIG. 1 except that the AGC circuit is omitted and that a waveform converter 19 and an amplitude-adjusting circuit 20 are added. The output signal from the phase-adjusting circuit 13 is supplied to the piezoelectric device 7 via the waveform converter 19 and via the amplitude-adjusting circuit 20. The output signal from the waveform converter 19 is supplied to the frequency-to-voltage converter 14.

Figure 2A:
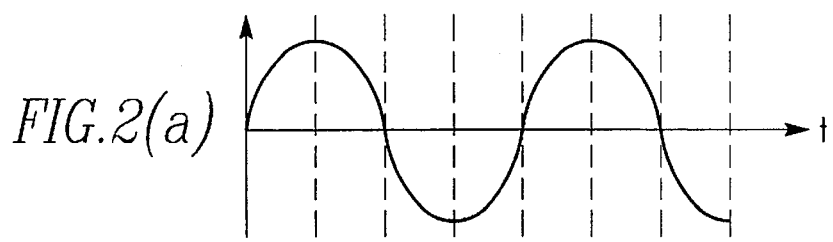
FIGS. 2(a)–2(c) are waveform diagrams illustrating the operation of instruments shown in FIGS. 1 and 3.
Figure 2B:
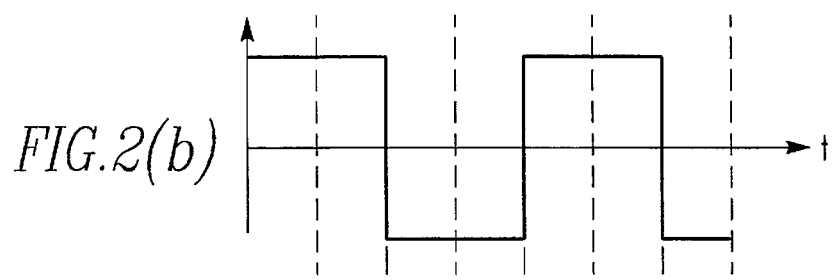

In this structure, the output signal from the photodetector 9 which represents vibration of the cantilever 5 is sent to the band-pass filter 12. The waveform of the output signal from this filter 12 is shown in FIG. 2(a). The output signal from the filter 12 is fed to the waveform converter 19 via the phase-adjusting circuit 13. The waveform converter 19 may comprise a comparator or Schmitt trigger, for example. The waveform converter generates a periodic pulse train having the same period as the output of the waveform detector. Typically, the waveform converter 19 changes a sinusoidal-wave signal shown in FIG. 2(a) into a square-wave signal of a constant amplitude as shown in FIG. 2(b). The waveform converter may comprise a squaring circuit wherein a comparator detects a threshold crossing of the output signal of the displacement detector.

Figure 2C:
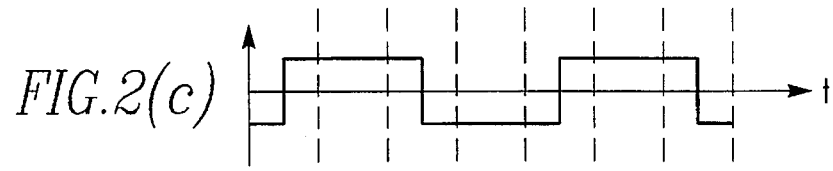

The amplitude of this square-wave signal is adjusted, as shown in FIG. 2(c), by the amplitude-adjusting circuit 20 including an attenuator. The output signal from the amplitude-adjusting circuit 20 is supplied as a driving signal to the piezoelectric device 7. The phase-adjusting circuit 13 adjusts the phase of the oscillating signal in such a way that the oscillation system operates with the maximum positive feedback. In this manner, a self-oscillating loop for positive feedback is formed. The cantilever 5 keeps vibrating at a given amplitude. The attenuation factor of the amplitude-adjusting circuit 20 is appropriately adjusted so that the amplitude of the vibration of the cantilever 5 assumes an appropriate value of several or tens of nanometers.

This structure uses no AGC circuit and so the factors that impede stable self-oscillation with good response (i.e., the time constant with which the AGC circuit operates and variations in the phase of the output signal from the AGC circuit) are eliminated. As a result, stable self-oscillation showing good response can be continued.

Furthermore, since the square-wave signal having sufficient and constant amplitude is supplied to the frequency-to-voltage converter 14 from the waveform converter 19, the frequency-to-voltage conversion can be effected more stably and accurately than the prior art instrument where the output signal from the photodetector 9 is directly supplied to the converter 14. Because the voltage signal $V_{fv}$ obtained by the aforementioned stable and accurate conversion is fed to the reference voltage comparator 15, the optimum feedback signal is obtained from this comparator 15. This optimum feedback signal is fed to the z-scanner drive circuit 17 and the z-position of the sample is controlled. Therefore, the z-scanner 2 is driven adequately. The result is that the sample is imaged well.

In the description made above, an optical lever is employed to detect displacements of the cantilever. Instead, another method using light interference or electrostatic capacitance may be utilized.

If the square-wave signal from the amplitude-adjusting circuit 20 is converted into a voltage signal of sinusoidal wave and applied to the piezoelectric device 7, then the cantilever 5 can be vibrated more stably. One method for converting the square wave into a sinusoidal wave consists of integrating the square wave so as to change it into a triangular wave and shaping the triangular wave into a sinusoidal wave digitally using plural comparators.

Furthermore, in the above description, the sample is displaced relative to the probe in the z-direction and scanned in the x- and y-directions. Since the displacements and scan are relative in nature, the probe may be displaced in the z-direction and/or scanned in the x- and y-directions instead of the sample.

As can be understood from the description made thus far, in the present invention, a cantilever can be vibrated at a constant amplitude at all times by providing a waveform converter. Moreover, an accurate sample image can be derived because a feedback signal is produced according to the waveform converter output of sufficient and constant amplitude and because the distance between the sample and probe is controlled according to this feedback signal.

Having thus described my invention with the detail and particularity required by the Patent Laws, what is claimed protected by Letters Patent is set forth in the following claims.

What is claimed is:

1. A scanning probe microscope comprising:

a cantilever having one end fixed and another end to which a probe is attached;

a displacement detector for detecting displacement of said cantilever;

a waveform converter for converting an output signal from said displacement detector into a periodic pulse train waveform having a constant amplitude;

an amplitude-adjusting circuit for varying said amplitude of said waveform from said waveform converter; and a means for vibrating said cantilever according to an output signal from said amplitude-adjusting circuit.

2. A scanning probe microscope comprising:

a cantilever having one end fixed and another end to which a probe is attached;

a displacement detector for detecting displacement of said cantilever;

a waveform converter for converting an output signal from said displacement detector into a periodic pulse train waveform having a constant amplitude;

an amplitude-adjusting circuit for varying said amplitude of said waveform signal from said waveform converter;

a means for vibrating said cantilever according to an output signal from said amplitude-adjusting circuit;

a means for creating from an output signal from said waveform converter a feedback signal for varying distance between a sample and said probe according to said waveform signal from said waveform converter so that vibration frequency of said cantilever assumes a selected value; and a means for varying the distance between said sample and said probe according to said feedback signal.

3. A scanning probe microscope according to claim 1 or 2, wherein the waveform converter is a squaring circuit.

4. A scanning probe microscope according to claim 3, wherein the waveform converter comprises a Schmidt trigger circuit.

5. A scanning probe microscope according to claim 4, wherein the squaring circuit comprises a comparator for detecting a threshold crossing of the output signal from the displacement detector.

* * * * *